UNITED STATES PATENT OFFICE 2,139,369

PLASTIC COMPOSITIONS

Lucas P. Kyrides, Webster Groves, Mo., assignor to Monsanto Chemical Company, St. Louis, Mo., a corporation of Delaware No Drawing. Application September 16, 1936,
Serial No. 101,037

11 Claims. (Cl. 106—22)

The present invention relates to a series of derivatives of wide utility as plasticizing and softening agents for plastic compositions and synthetic resins. It relates particularly to esters and ethers of xylylene glycols.

A wide variety of plasticizers and softening agents for various materials are available at present. From this wide range of substances it is possible to select one material which is better than another material in respect to a certain property, but this choice is usually made at the sacrifice of another desirable property inherent in the original material. Thus, although the range of properties offered by the common known plasticizing agents is wide, the substances combining a multitude of desirable properties are few in number. It is an object of the invention to provide a series of compounds of especial value for plasticizing or softening cellulose esters and ethers and synthetic resins, particularly those produced by condensation of aldehydes with partially hydrolyzed polymerization products of vinyl esters, which plasticizing compounds shall possess a desirable combination of properties.

The plasticizers of the present invention impart flexibility to an unexpected degree at low temperatures. The invention contemplates as one of its objects, to provide films whose flexibility is substantially unimpaired at temperatures as low as —20° F., for which purpose the common known plasticizing agents are only of limited utility.

It is another object of the invention to provide methods for the production of these plasticizing agents, which methods shall be simple and economical.

The products of the invention are esters and ethers of xylylene glycols, of which three isomers exist, the ortho, meta and para xylylene glycols:

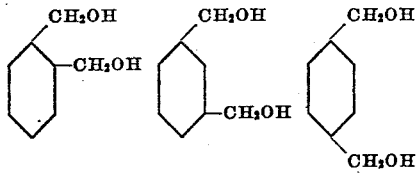

The three xylylene glycols can be prepared from the corresponding dichlorides, ClCH$_2$C$_6$H$_4$CH$_2$Cl, by replacement of the chlorine atoms by hydroxyl groups in well known manners, for example, by hydrolysis under pressure, or by saponification with alkalies.

To obtain the esters and ethers of the invention, however, it is not necessary to prepare the glycols themselves. The mixture of ortho and para xylylene dichlorides obtained by treatment of benzyl chloride with formaldehyde in the presence of zinc chloride may be used as the starting material for the production of the esters and ethers of this invention. Detailed procedures for the production of the xylylene dichlorides and esters and ethers derived therefrom are indicated hereinafter.

The pure xylylene glycols are known, as are some of their esters and ethers. This invention is based on the discovery of the value of these substances as plasticizing agents, particularly for resins resulting from the condensation of formaldehyde with partially hydrolyzed polymers of vinyl acetate. Furthermore, the discovery that a mixture of the ortho and para isomers can be used instead of the individual isomers themselves, makes it possible to utilize the invention to greater economic advantage. In some cases, the reaction mixture of isomeric derivatives produces more marked plasticizing effects than either of the pure isomers alone. Of even greater economic importance is the fact that a reaction mixture consisting of ortho and para xylylene dichlorides, dichloroditolylmethanes in which the chlorine substituents are in the methyl side chains and by-products of unknown constitution, can be esterified or etherified directly and used as plasticizers for the products herein described.

To more thoroughly comprehend the invention, the examples which follow are cited as illustrative of the method of making and utilizing the products.

*Example I—Preparation of xylylene dichlorides*

The reaction by which ortho and para xylylene dichlorides result can be indicated as:

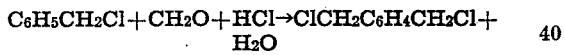

C$_6$H$_5$CH$_2$Cl + CH$_2$O + HCl → ClCH$_2$C$_6$H$_4$CH$_2$Cl + H$_2$O

A mixture of 500 grams (approximately 4 moles) of benzyl chloride, 66 grams of anhydrous technical zinc chloride and 60 grams (2 moles) of paraformaldehyde are agitated at 50° to 80° C. A rapid current of dry hydrogen chloride is passed into the mixture and the temperature is maintained at 50° to 80° C. by cooling. After saturation with hydrogen chloride the mixture is maintained at 80° C. for one hour while a slow current of hydrogen chloride is passed thereinto.

The resulting liquid mixture which is still warm is allowed to settle and the clear oil layer is separated, washed several times successively with water, sodium carbonate solution, and water, and then fractionally distilled. The excess benzyl chloride passes over, followed by a fraction boiling from about 142° to 147° C. at 27 mm. consisting essentially of the mixture of ortho and para xylene dichlorides. This mixture crystallizes on cooling. Pure p-xylene dichloride can be separated by any of the known methods or by following the procedure outlined by Quelet in the Bull. Soc. Chim., 1933, vol. 53, pp. 222–234.

If the distillation is carried further, a liquid is isolated boiling from about 140° to 190° C. at a pressure of 7 mm. This fraction upon standing deposits a crystalline product which upon recrystallization was found to be omega, omega'-dichloroditolylmethane. An appreciable amount of residue boiling still higher remains. The yield of xylylene dichlorides obtained by this procedure is good.

In using commercial 37% formaldehyde solution, it was found necessary to use a much larger proportion of zinc chloride to obtain good yields.

In case it is desired to isolate the pure ortho-xylylene dichloride, the mother liquors from the para isomer are carefully fractionated and crystallized.

*Example II—Preparation of xylylene glycol diacetates*

The diacetates of the xylylene glycols can be prepared conveniently from the mixed xylylene dichlorides obtained above in the following manner:

Approximately 90 grams of anhydrous sodium acetate are stirred with 150 cc. of glacial acetic acid and the mixture is heated to boiling under reflux. To this is then added slowly 86 grams of the xylylene dichlorides, prepared as in Example I or by a similar procedure, dissolved in about 50 cc. of warm glacial acetic acid. The mixture is gently boiled and stirred for an additional period of about four hours at most and then the excess of acetic acid is distilled off, preferably in vacuum.

The reaction mixture is cooled and sufficient water is added to dissolve the salts. The two layers are separated and the oil layer is washed several times with water and then with dilute sodium bicarbonate solution and again with water.

The oil layer is then distilled preferably under vacuum. The diacetates boil at about 158° to 162° C. at 7 mm. The yield is good.

To prepare ortho-xylylene glycol diacetate instead of the mixed diacetates, the ortho dichloride is used instead of the mixed dichlorides, and similarly the para or meta dichloride is used to prepare the para or meta-xylylene glycol diacetate.

*Example III—Preparation of xylylene glycol propionates*

The preparation of the xylylene glycol propionates is similar to the preparation of the diacetates described in Example II, with the exception that sodium propionate is used.

Forty grams of sodium hydroxide, preferably in pellets, are stirred with 250 grams of commercial propionic acid and gradually heated therewith until dissolved. The water is removed by evaporation or preferably by distillation through a short column until the main portion of the mixture or the vapors register about the boiling point of propionic acid. The solution of sodium propionate in propionic acid is cooled somewhat and 85.5 grams of xylylene dichlorides, prepared as in Example I, are added. The mixture is heated with stirring at 130° to 140° C. several hours and part of the excess propionic acid is preferably removed by distillation in partial vacuum with continued stirring.

Water is added to the reaction mixture in an amount sufficient to dissolve the sodium chloride formed. The lower aqueous layer is discarded or may be used for the recovery of propionic acid. The ester has a high specific gravity and in the subsequent washes with water it separates as the lower layer. Any small quantities of ester carried away in the aqueous layer or in the washings can be recovered by extraction with benzene. The ester is recovered by fractionation in vacuum.

The xylylene glycol propionates were found to boil at 164° to 170° C. at 6 mm.

*Example IV—Preparation of xylylene glycol butyrates*

The preparation of the mixed butyrates is conducted exactly as the preparation of the propionates in Example III, with the exception that butyric acid is used instead of propionic acid. The xylylene glycol-n-dibutyrate distills at a temperature of about 180° to 188° C. at a pressure of 6 mm.

*Example V—Preparation of xylylene glycol diether of glycol monomethyl ether*

Forty grams of sodium hydroxide are stirred with about 250 grams of ethylene glycol monomethyl ether (known under the trade name of "Methyl Cellosolve") contained in a flask in a water bath. Considerable heat is liberated during the solution and the temperature is maintained below about 50° C. The mixture is stirred until all the sodium hydroxide is dissolved. The solution is then dehydrated by distillation in vacuum, the distillation being carried on until a small portion of the excess of "Methyl Cellosolve" is also distilled to insure complete dehydration. While stirring and maintaining the solution at about 70° C., there are added 84 grams of xylylene dichlorides prepared as in Example I. The temperature rises rapidly but by controlling the additions and by means of a water bath the temperature is not permitted to exceed about 80° C. After the addition, the flask is maintained in the water bath at 80° C. for a period of three hours while the mixture is stirred continuously.

The mixture is then diluted with 10 cc. water and cooled, filtered and the residue on the filter is washed with alcohol. The mixture is then separated by distillation in vacuum.

The diether boils at about 182° to 184° at a pressure of 9 mm. It is referred to hereinafter as xylylene glycol di-(ethylene glycol monomethyl ether) ether or simply as xylylene glycol diether of methyl cellosolve or methyl cellosolve diether of xylylene glycol.

The preparation of the diethyl ethers of xylylene glycols and the dibutyl ethers of the xylylene glycols can be carried out similarly or as outlined by Quelet in the article mentioned previously. Similarly other ethers may be prepared from either of the three xylylene dichlorides or glycols with a wide variety of alcohols, for example, methyl, ethyl, propyl, isopropyl, butyl, isobutyl, the amyl, hexyl and octyl alcohols, as well as benzyl alcohol and similar aralkyl alcohols.

Esters of the xylylene glycols can be made by esterification with formic, butyric, octoic and similar aliphatic acids as well as with benzoic, salicylic and other aromatic acids. Esterification with mono-esters of dicarboxylic acids, for example, mono-ethyl phthalate can be similarly conducted. High boiling resinous esters are obtained when xylylene glycols are condensed with a dicarboxylic acid, such as maleic, succinic, phthalic and similar acids. These products exhibit plasticizing effects similar to those esters and ethers more completely described hereinafter.

One of the most striking properties of the esters and ethers of xylylene glycol, when used as plasticizers, are their good compatibility with cellulose esters and ethers and synthetic resins and their low-temperature characteristics, which latter criterion has become of increasing importance in the manufacture of sheeting to be used in laminated or sandwich glass, that is, the so-called "safety" glass.

As a criterion of compatibility, compatibility tests with a resin made by condensing formaldehyde with the partially hydrolyzed polymerization product of vinyl esters (known under the trade name "Formvar") and tests with cellulose acetate are severe and all these esters and ethers, especially the diacetates and dipropionates and the methyl cellosolve diethers of xylylene glycols, show greatly improved characteristics in such tests.

In comparison with other common plasticizers the substances themselves generally exhibit greater fluidity at low temperature. The following table illustrates the differences in viscosities at the indicated tmeperatures observed between the various isomers and the corresponding viscosity characteristic of a plasticizer (dimethyl phthalate) which has hitherto been recognized as possessing good low-temperature plasticizing properties.

*Viscosities*

| Plasticizer | Temperature | | |
|---|---|---|---|
| | 0° C. | −15° C. | −33° C. |
| Dimethyl phthalate | | Very viscous | |
| Xylylene glycol dibutyl ethers | Quite fluid | Mod. fluid | Mod. fluid. |
| Xylylene glycol diacetates | Crystallized | | |
| Xylylene glycol diethers of methyl cellosolve | Quite fluid | Slightly viscous | Slightly vicous. |
| Xylylene glycol dibutyrates | Mod. fluid | Slightly viscous | Solidified. |
| Xylylene glycol dipropionates | Mod. fluid | Slightly viscous | Mod. viscous. |
| Xylylene glycol diethly ethers | Quite fluid | | Quite fluid. |

In comparison with the fluidity of the mixed dipropionates of xylylene glycols at −33° C., as given above, the substantially pure dipropionate or ortho-xylylene glycol is moderately fluid but the substantially pure dipropionate of para-xylylene glycol has crystallized at that temperature. In the practice of the invention, therefore, it is advantageous to use the mixture of the isomers such as results in the examples given.

The low temperature characteristics of the plasticizing agents, although indicated by the viscosity data above, are still more strikingly demonstrated by bending tests. In these tests 120 parts of the plasticizing agent were incorporated into 100 parts of cellulose acetate and a sheet was formed therefrom. Sheets of uniform and standard thickness were subjected to bending through an angle of 180°. The number of such bends which the sheets withstand at a definite temperature is taken as a measure of flexibility. At a temperature of −20° F., and under exactly comparable conditions, films of 100 parts of cellulose acetate plasticized with 120 parts of the following plasticizers withstood the number of bends indicated:

*Bending tests*

| | Bends |
|---|---|
| Dimethyl phthalate | 7 |
| Diethyl phthalate | 416 |
| Xylylene glycol diacetates | 1200 |

The water solubility of the xylylene glycols is low. In comparison with other plasticizers, the water solubilities, expressed as grams of plasticizers, dissolved by 100 grams of saturated solution, as given below, are indicative of the superiority of the products of the invention.

*Water solubility*

| | Grams/100 grams water |
|---|---|
| Dimethyl phthalate | 0.4 |
| Diethyl phthalate | 0.058 |
| Xylylene glycol diacetates | 0.145 |
| Xylylene glycol dipropionates | 0.015 |
| Xylylene glycol diether of methyl cellosolve | 0.208 |

The plasticizing agents may be incorporated into a composition by any of the well known methods. Thus, for cellulose acetate, it is preferred to dissolve the plasticizer in a mutual solvent, such as acetone. For incorporating the plasticizer in resinous compositions, the resin and the plasticizer can be pressed or molded together into sheets or other shapes by means of pressure and, if necessary, heat, after having been preliminarily blended together by mixing, for example, in a ball mill or Werner-Pfleiderer mixer. For incorporating the plasticizer into liquid coating compositions or into solutions for spinning into fibers it is usually found that the plasticizer as such is miscible without any additional special provisions being necessary for dissolving it therein. However, if such is not the case, a solvent which is miscible with the composition and which is also a solvent for the plasticizer can be used. The plasticizers of the invention are soluble in alcohols; aromatic and aliphatic hydrocarbon solvents, such as benzene and petroleum naphtha; esters, such as ethyl acetate; ketones, such as acetone and diacetone; oils and other solvents; thus the choice of a mutual solvent is wide.

The proportion of the plasticizer to be added to any particular plastic composition is dependent upon the degree of flexibility desired and the retentivity of the plasticizer in the particular material. The retentivity of the plasticizers of the invention is moderately high, thus, for example, more than 120 parts of the diacetates are retained by 100 parts of cellulose acetate. Because of this high retentivity, sheets plasticized with these agents do not readily exude the plasticizing agent, hence the invention is particularly applicable to the production of sheets to be used for wrapping foods, whereby contamination of the food product is avoided, and for sheeting for use in laminated glass, whereby the transparency of the glass is not impaired.

In plastic compositions such as sheeting for wrapping purposes and molded cellulosic forms, it is customary to use about 20% of a plasticizer such as dibutyl phthalate. In the production of sheeting for use in laminated glass higher proportions are used, for example, proportions varying from 40 to 60% (that is, 40 to 60 parts per 100 parts of material to be plasticized). These percentages of the plasticizers of the present invention give highly satisfactory sheets for use in laminated glass production.

Examples of typical methods of preparing compositions with the plasticizers of the present invention follow:

Example VI

To 100 parts of cellulose acetate dissolved in sufficient acetone to give a clear solution are added 60 grams of the xylylene glycol propionates prepared in Example III. This solution when spread on a smooth surface deposits a tough, flexible, brilliant, transparent, clear film. By addition of pigments and resins to this solution a lacquer can be prepared.

Example VII

To 100 parts of a "Formvar" resin are added 60 parts of the xylylene glycol diacetates prepared in Example II. This mass is then kneaded at about 150° C. until thorough incorporation results. It is then pressed out in sheets, either by means of hot rolls or by pressing between two smooth surfaces. The resulting film is clear, transparent, brilliant and possesses a remarkable degree of flexibility and toughness.

The plasticizers of the invention are applicable to the treatment of such varied synthetic resins as those derived from styrene, vinyl esters, resins of the glyptal type, phenol-aldehyde resins, and to cellulose esters and ethers, including cellulose acetate, nitrocellulose and ethyl cellulose. A part of the plasticizer may be replaced, if desired, by one or more plasticizers or conditioning agents, such as dibutyl phthalate, triacetin, tricresyl phosphate, para-toluene-sulfonamides, etc. Substances which reduce the inflammability or modify the properties of the resulting products in other well known manners, may also be added.

Films produced by the use of these plasticizers with cellulose esters have brilliant transparency, are smooth, tough and flexible and retain this flexibility at low temperatures in a superior fashion. Such films are well adapted for wrapping purposes, as decorative sheets, for interspersing between glass plates in laminated glass and as supports for photographic emulsions.

Inasmuch as the above description comprises preferred embodiments of the invention, it is to be understood that wide variations may be made to adapt it to particular applications without departing substantially from its scope, which is defined in the claims.

What I claim is:

1. An organic plastic composition comprising a plastic material selected from the group consisting of cellulose esters, cellulose ethers, alkyd resins, phenol-aldehyde resins, vinyl ester and vinyl acetal resins, which composition contains a compound selected from the group consisting of the esters and ethers of the xylylene glycols.

2. A cellulosic plastic composition containing a compound selected from the group consisting of the esters and ethers of the xylylene glycols.

3. A cellulose acetate plastic composition containing a compound selected from the group consisting of the esters and ethers of the xylylene glycols.

4. A plastic composition comprising a resin resulting from the condensation of an aldehyde with a partially hydrolyzed polymer of a vinyl ester and containing a compound selected from the group consisting of the esters and ethers of the xylylene glycols.

5. A cellulosic plastic composition containing an aliphatic ester of a xylylene glycol.

6. A cellulose acetate plastic composition containing an aliphatic ester of a xylylene glycol.

7. A plastic composition comprising a resin resulting from the condensation of an aldehyde with a partially hydrolyzed polymer of a vinyl ester and containing an aliphatic ester of a xylylene glycol.

8. A plastic composition comprising a resin resulting from the condensation of an aldehyde with a partially hydrolyzed polymer of a vinyl ester and containing an aliphatic ether of a xylylene glycol.

9. A cellulose acetate plastic composition containing a xylylene glycol diacetate.

10. A plastic composition comprising a vinyl acetal resin resulting from the condensation of formaldehyde with a partially hydrolyzed vinyl acetate polymer and containing a xylylene glycol di-(ethylene glycol monomethyl ether) ether.

11. A plastic composition comprising a vinyl acetal resin resulting from the condensation of formaldehyde with a partially hydrolyzed vinyl acetate polymer and containing a xylylene glycol diacetate.

LUCAS P. KYRIDES.